United States Patent
Oura et al.

(10) Patent No.: US 10,268,133 B2
(45) Date of Patent: Apr. 23, 2019

(54) CONDUCTIVE ROLL

(71) Applicants: NOK CORPORATION, Tokyo (JP); SYNZTEC CO., LTD., Tokyo (JP); NOK KLUEBER CO., LTD., Tokyo (JP)

(72) Inventors: Kousuke Oura, Kanagawa (JP); Hiroshi Ogura, Kanagawa (JP); Masaki Tahara, Ibaraki (JP)

(73) Assignees: NOK CORPORATION, Tokyo (JP); SYNZTEC CO., LTD., Tokyo (JP); NOK KLUEBER CO., LTD., Tokyo (JP)

( * ) Notice: Subject to any disclaimer, the term of this patent is extended or adjusted under 35 U.S.C. 154(b) by 0 days.

(21) Appl. No.: 16/069,432

(22) PCT Filed: Aug. 1, 2017

(86) PCT No.: PCT/JP2017/027917
§ 371 (c)(1),
(2) Date: Jul. 11, 2018

(87) PCT Pub. No.: WO2018/025870
PCT Pub. Date: Feb. 8, 2018

(65) Prior Publication Data
US 2019/0025727 A1    Jan. 24, 2019

(30) Foreign Application Priority Data

Aug. 4, 2016  (JP) .................. 2016-154012

(51) Int. Cl.
*G03G 15/02* (2006.01)
*F16C 13/00* (2006.01)
(52) U.S. Cl.
CPC ......... *G03G 15/0233* (2013.01); *F16C 13/00* (2013.01)

(58) Field of Classification Search
CPC .... G03G 15/02; G03G 15/0233; G03G 15/08; G03G 15/16
(Continued)

(56) References Cited

U.S. PATENT DOCUMENTS

| 5,497,219 A | 3/1996 | Kurokawa et al. |
| 6,684,043 B1 * | 1/2004 | Zona .................. G03G 15/0233 399/176 |

(Continued)

FOREIGN PATENT DOCUMENTS

| CN | 102033459 A | 4/2011 |
| JP | H07-49605 A | 2/1995 |

(Continued)

OTHER PUBLICATIONS

International Search Report, dated Sep. 5, 2017, from corresponding PCT application No. PCT/JP2017/027917.

*Primary Examiner* — Hoan H Tran
(74) *Attorney, Agent, or Firm* — Young & Thompson

(57) ABSTRACT

This conductive roll includes: at least one elastic layer 12 including primarily a conductive rubber body and provided along the outer periphery of a core 11; and a coating layer 14 provided along the outer periphery of the elastic layer 12. The conductive roll satisfies the following expressions: circumference Sm1≤135 μm and circumference Sm1<circumference Sm2 wherein circumference Sm1 represents an average interval Sm of irregularities along the circumferential direction of the elastic layer 12, and circumference Sm2 represents an average interval Sm of irregularities along the circumferential direction of the coating layer 14.

4 Claims, 1 Drawing Sheet

(58) Field of Classification Search
USPC .............. 399/107, 110, 115, 168, 174, 176
See application file for complete search history.

(56) References Cited

U.S. PATENT DOCUMENTS

| | | | |
|---|---|---|---|
| 7,869,741 B2 * | 1/2011 | Mayuzumi | G03G 15/0233 |
| | | | 399/115 |
| 8,583,011 B2 | 11/2013 | Miyaji et al. | |
| 8,706,007 B2 | 4/2014 | Miyaji et al. | |
| 9,291,936 B2 * | 3/2016 | Taniguchi | G03G 15/0233 |
| 9,703,226 B2 | 7/2017 | Kuroda | |
| 2009/0092421 A1 | 4/2009 | Sato | |

FOREIGN PATENT DOCUMENTS

| | | |
|---|---|---|
| JP | 2003-202722 A | 7/2003 |
| JP | 2004-306519 A | 11/2004 |
| JP | 2005-091414 A | 4/2005 |
| JP | 2006-145956 A | 6/2006 |
| JP | 2009-080207 A | 4/2009 |
| JP | 2011-095725 A | 5/2011 |
| JP | 2011-232433 A | 11/2011 |
| JP | 2012-014141 A | 1/2012 |
| JP | 2015-052680 A | 3/2015 |
| JP | 2015-121769 A | 7/2015 |

* cited by examiner

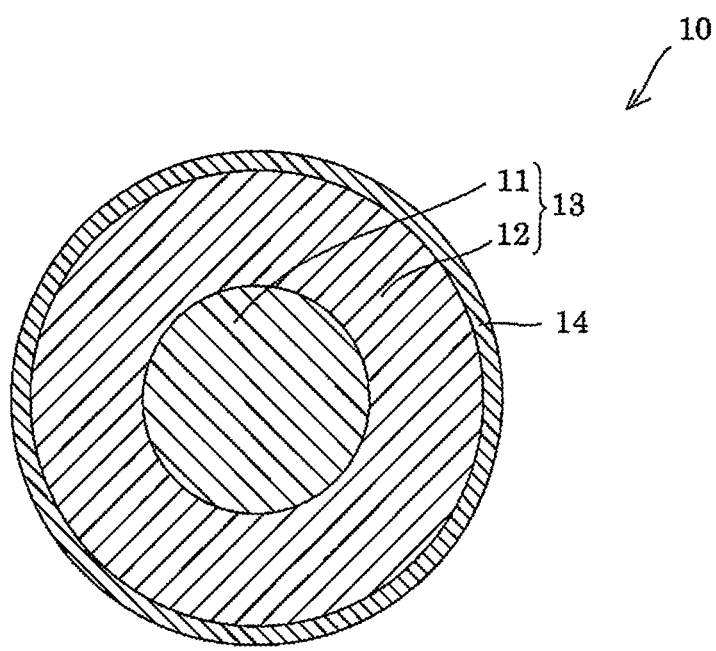

CONDUCTIVE ROLL

TECHNICAL FIELD

The present invention relates to a conductive roller employed in image-forming apparatuses including an electrophotographic copying machine or printer, and a toner-jet-type copying machine or printer. More particularly, the invention relates to a charge roller to be employed for uniformly imparting electric charge to a photoreceptor or the like of an image-forming apparatus.

BACKGROUND ART

Generally known image-forming apparatuses include an electrophotographic copying machine or printer, and a toner-jet-type copying machine or printer. Such an image-forming apparatus generally includes a photoreceptor (e.g., a photoreceptor drum), which generates electric charge upon light exposure. In addition to the photoreceptor, the image-forming apparatus has a plurality of conductive members including conductive rollers such as a development roller, a charge roller, a transfer roller, and a toner-supplying roller, and a conductive belt such as a transfer belt.

One known conductive roller is a bi-layer configuration conductive roller having a core, an elastic layer which is made of conductive rubber and formed on the core, and a coating layer which protects the elastic layer and is formed on the elastic layer. Another known conductive roller is a tri-layer configuration conductive roller having, between the elastic layer and the coating layer, a resistance-adjusting layer which can control the electric resistance of the conductive roller and is formed of another conductive rubber.

Preferably, conductive rollers can uniformly retain a specific amount of toner on their roller surfaces. The amount of the toner maintained on the surface of the roller depends mainly upon the surface roughness of the roller or upon electric force attributed to the amount of charged toner. Thus, excellent image development characteristics (e.g., uniformity in image density) can be ensured by regulating the surface micro-roughness of the conductive roller, to thereby control the amount of toner transported to the conductive roller. For this purpose, there have been proposed a variety of techniques which provide appropriate micro-surface roughness of such rollers through incorporation of microparticles into the aforementioned coating layer.

For example, Patent Document 1 discloses a charge-imparting member as an example of the above techniques. The charge-imparting member includes a conductive support, a conductive elastic layer stacked on the conductive support, and a conductive resin layer stacked as the outermost layer on the conductive elastic layer. The conductive resin layer contains a matrix material and at least one particulate material selected from the group consisting of resin particles and inorganic particles, wherein the particulate material contains first particles. In the case where the thickness of the layer which is formed only of the matrix material and which is included in the conductive resin layer is represented by A [μm], the mean particles size of the particles is represented by $B_1$ [μm], and the inter-particle distance is represented by Sm [μm], A is 1.0 μm to 7.0 μm, $B_1/A$ is 5.0 to 30.0, and Sm is 50 μm to 400 μm.

Patent Document 2 discloses an image-forming apparatus as another example of the above techniques. The image-forming apparatus includes a charge-imparting unit having an electrophotographic photoreceptor (positively charged type, single layer) and a contact charge-imparting member for electrifying the surface of the photoreceptor; a light exposure unit for irradiating the surface of the charged image on the support with light, to thereby form an electrostatic latent image on the surface of the support; a development unit for developing the electrostatic latent image, to thereby form a toner image; and an image transfer unit for transferring the toner image on the support to a transfer target. The contact charge-imparting member is a charge roller formed of a conductive rubber having a rubber hardness (Asker-C hardness) of 62° to 81°. The surface roughness of the charge roller of the contact charge-imparting member is defined by an average inter-groove (inter-gap) distance along a cross-section curve (Sm) of 55 μm to 130 μm, and a ten-point average roughness (Rz) of 9 μm to 19 μm.

Patent Document 3 discloses a charge roller as another example of the above techniques. The charge roller includes a conductive support, a semi-conducting elastic layer in the roller form provided on the conductive support, and a protective layer formed on the semi-conducting elastic layer. The protective layer is formed by applying a coating liquid for forming the protective layer, the coating liquid containing microparticles exhibiting a function of preventing deposition of external material on the protective layer. The volume average particle size of the microparticles is regulated so that the surface roughness of the protective layer is adjusted to 1 μm or less.

According to the techniques disclosed in Patent Documents 1 to 3, uniformity in image density can be ensured by controlling the surface roughness of the top surface of the conductive roller by the action of microparticles incorporated into the coating layer. However, since in recent years image-forming apparatuses provide high-quality images at low current, generation of image unevenness cannot be prevented merely by controlling the surface roughness of the top surface of the conductive roller. In such a case, uniformity in image density fails to be ensured, which is problematic.

PRIOR ART DOCUMENTS

Patent Documents

Patent Document 1: Japanese Patent Application Laid-Open (kokai) No. 2015-121769
Patent Document 2: Japanese Patent Application Laid-Open (kokai) No. 2012-14141
Patent Document 3: Japanese Patent Application Laid-Open (kokai) No. 2005-91414

SUMMARY OF THE INVENTION

Problems to be Solved by the Invention

Under such circumstances, an object of the present invention is to provide a conductive roller which can ensure uniform image density, which can be attained by controlling the surface roughness of the elastic layer, to thereby suppress generation of image unevenness.

Means for Solving the Problem

In a first mode of the present invention for attaining the aforementioned object, there is provided a conductive roller having a core, at least one elastic layer which is mainly formed of a conductive rubber body and provided on the core, and a coating layer provided on the elastic layer, characterized in that a mean irregularity interval (Sm) along the circumferential direction of the elastic layer is defined as circumferential Sm1, and a mean irregularity interval (Sm) along the circumferential direction of the coating layer is defined as circumferential Sm2, wherein circumferential Sm1 and circumferential Sm2 satisfy the following formulas (1) and (2):

$$\text{circumferential } Sm1 \leq 135 \text{ μm} \tag{1}$$

$$\text{circumferential } Sm1 < \text{circumferential } Sm2. \tag{2}$$

A second mode of the present invention is directed to a specific embodiment of the conductive roller of the first mode, wherein a ten-point average roughness (Rz JIS 94) along the circumferential direction of the elastic layer is defined as circumferential Rz1, which satisfies the following formula (3):

$$\text{circumferential } Rz1 \leq 15 \text{ μm} \tag{3}$$

A third mode of the present invention is directed to a specific embodiment of the conductive roller of the first or second mode, wherein a ten-point average roughness (Rz JIS 94) along the axial direction of the elastic layer is defined as axial Rz1, which satisfies the following formulas (4) and (5):

$$|\text{axial } Rz1 - \text{circumferential } Rz1| \geq 0.1 \text{ μm} \tag{4}$$

$$\text{axial } Rz1 \leq 10 \text{ μm} \tag{5}$$

A fourth mode of the present invention is directed to a specific embodiment of the conductive roller of any of the first to third modes, wherein the coating layer contains a base material, an electric conductivity-imparting agent (hereinafter may be referred to simply as conducting agent), and a surface roughness-imparting agent, and when the total amount of these components is 35 parts by mass to 175 parts by mass, the amount of the surface roughness-imparting agent is 4 parts by mass to 45 parts by mass.

Effects of the Invention

According to the present invention, there can be provided a conductive roller that can ensure uniform image density. The uniformity can be attained by controlling the surface roughness of the elastic layer, to thereby suppress generation of image unevenness.

BRIEF DESCRIPTION OF THE DRAWINGS

FIG. 1 Schematic cross-section of a charge roller according to the embodiment, cut along the circumferential direction.

MODES FOR CARRYING OUT THE INVENTION

The present invention will next be described in detail by way of the following embodiment, which is given for the purpose of illustration. Needless to say, the present invention may be modified in any manner, so long as it does not deviate from the gist of the present invention. In the following embodiment, a charge roller is taken as an example of the conductive roller. However, the conductive roller of the present invention is not limited thereto and may be a development roller, a transfer roller, a toner-supplying roller, or the like.

FIG. 1 is a schematic cross-section of a charge roller according to the embodiment, cut along the circumferential direction. As shown in FIG. 1, a charge roller 10 has a roller substrate 13 which is composed of a core 11, and an elastic layer 12 formed on the core 11. On the roller substrate 13 (elastic layer 12), a coating layer 14 is formed to cover the surface. Although the details will be described later, in the charge roller 10 of the embodiment, the surface roughness of the roller substrate 13 is regulated. In contrast, in a conventional charge roller, the surface roughness of the top surface (the surface of the coating layer) is regulated. Through providing the coating layer 14 on the roller substrate 13, the resultant charge roller 10 undergoes no uneven discharge and can realize uniform discharge, whereby a predetermined amount of a toner can be uniformly retained on the surface of the charge roller 10. In addition, through regulating the amount of the toner transferred to the charge roller 10 to an appropriate level, generation of image unevenness is suppressed, to thereby ensure uniform image density. As a result, excellent development performance can be ensured.

The core 11 is made of a metallic or resin material which has excellent thermal conductivity and mechanical strength. No particular limitation is imposed on the material of the core 11, and metallic materials such as SUS alloy, nickel (Ni), nickel alloy, iron (Fe), magnetic stainless steel, cobalt-nickel (Co—Ni) alloy, and resin materials such as polyimide (PI) resin may be used. Also, no particular limitation is imposed on the shape of the core 11. The core 11 may be hollow or non-hollow. In the present embodiment, a metallic core is employed as the core 11.

The roller substrate 13 has the core 11, and the elastic layer 12 formed on the core 11. The elastic layer 12 is formed of a rubber elastic body having a specific electric conductivity (hereinafter referred to as a "conductive rubber body"). No particular limitation is imposed on the elastic layer 12, so long as it is formed of a conductive rubber body. The elastic layer 12 may be of a single-layer configuration or a 2 or more-layer configuration. Also, an adhesion layer, an adjusting layer, or the like may be inserted between the core 11 and the elastic layer 12, in accordance with needs.

In the embodiment, the elastic layer 12 is formed of a conductive rubber body, which is produced by adding a conductivity-imparting agent, a vulcanizing agent, and the like to a rubber base, to thereby form a rubber composition, and molding and vulcanizing the composition. Examples of the rubber base include polyurethane rubber (PUR), epichlorohydrin rubber (ECO), nitrile rubber (NBR), styrene rubber (SBR), and chloroprene rubber (CR). In the embodiment, epichlorohydrin rubber is used.

The conductivity-imparting agent which may be used in the invention is carbon black, an electron conductivity-imparting agent (e.g., metal powder), an ion conductivity-imparting agent, or a mixture thereof. Examples of the ion conductivity-imparting agent include an organic salt, an inorganic salt, a metal complex, and an ionic liquid. Examples of the organic salt include sodium trifluoroacetate. Examples of the inorganic salt include lithium perchlorate and quaternary ammonium salts. Examples of the metal complex include ferric halide-ethylene glycol, specifically those disclosed in Japanese Patent No. 3655364. Meanwhile, ionic liquid is defined as a molten salt which is liquid at room temperature and is also called "ambient-temperature molten salt." The melting point of the ionic liquid is 70° C. or lower, preferably 30° C. or lower. Specific examples include those disclosed in Japanese Patent Application Laid-Open (kokai) No. 2003-202722.

No particular limitation is imposed on the vulcanizing agent, and any known vulcanizing agent (e.g., sulfur and peroxides) may be used. In addition to the vulcanizing agent, in accordance with needs, the rubber composition may further contain a vulcanization accelerator, which promotes the action of the vulcanizing agent. Examples of the vulcanization accelerator include inorganic accelerators such as zinc oxide and magnesium oxide, and organic accelerators such as stearic acid and amines. Alternatively, in order to shorten vulcanization time or for other purposes, a thiazole-based vulcanization accelerator may be used. Notably, the rubber composition may contain other additives.

The surface roughness of the roller substrate 13 having the core 11 and the elastic layer 12 formed on the core 11 is controlled to the below-mentioned level, by polishing the roller substrate by means of a polishing machine to specific dimensions, and further dry-polishing with an abrasive stone. In one mode of dry polishing, a rotating abrasive stone is caused to abut the roller substrate 13 and is moved along the axial direction, while the roller substrate 13 is rotated. No particular limitation is imposed on the method of regulating the surface roughness of the roller substrate 13 to a specific level. In one specific procedure, the rotation rate of the abrasive stone of the polishing machine may be elevated successively from 1,000 rpm, to 2,000 rpm, to 3,000 rpm. Alternatively, the type of the abrasive stone may be changed. In one specific procedure, the grit size of a GC abrasive stone may be elevated successively from GC60, to GC120, to GC220.

In the embodiment, the surface roughness of the roller substrate 13 is regulated through dry polishing, so that the mean irregularity interval (Sm) along the circumferential direction (circumferential Sm1) of the elastic layer 12, and the mean irregularity interval (Sm) along the circumferential direction (circumferential Sm2) of the coating layer 14 satisfy the following formula (1). Although the details will be described later, the coating layer 14 is formed on the roller substrate 13, while the surface condition of the roller substrate 13 satisfying the following formula (1) is maintained to a maximum extent. In the embodiment, no particular limitation is imposed on the method of forming the coating layer 14 (mentioned below), so long as the layer can be formed while the surface condition of the roller substrate 13 is maintained. Therefore, an index for assessing maintenance of the surface condition of the roller substrate 13 of the charge roller 10 is preferably employed. Specifically, the following formula (2) may be employed as the index. More specifically, circumferential Sm1 and circumferential Sm2 are determined and compared before and after the coating process. When Sm1 and Sm2 satisfy the following formula (2) after coating (i.e., when circumferential Sm1 is smaller than circumferential Sm2), the surface condition of the roller substrate 13 can be assessed to be maintained.

$$\text{circumferential } Sm1 \leq 135 \text{ μm} \tag{1}$$

$$\text{circumferential } Sm1 < \text{circumferential } Sm2 \tag{2}$$

When the circumferential Sm1 of the roller substrate 13 (elastic layer 12) is adjusted to 135 μm or less, preferably 50 μm to 120 μm, and the coating layer 14 is formed such that the surface condition has been carried on from the elastic layer 12, the produced charge roller 10 can be provided with a polished surface having a highly polishing degree, which is equivalent to that of the surface of the roller substrate 13. Thus, circumferential Sm1 becomes smaller than circumferential Sm2. In the image-forming apparatus employing the charge roller 10 of the invention, when the charge roller 10 is caused to abut the photoreceptor, grooves are formed at constant intervals, whereby the charge roller 10 can maintain uniform gap distribution. As a result, generation of image unevenness is suppressed during image formation, and uniform image density is maintained, whereby excellent development performance can be ensured.

In contrast, when the charge roller 10 fails to satisfy the conditions (1) and (2), the top-to-top distance between grooves increases. In this case, the greater the circumferential Sm1, the greater the variation in top-to-top inter-gap distance. When the charge roller 10 falling outside the invention is caused to abut the photoreceptor, grooves are formed at varied intervals, whereby the charge roller 10 fails to maintain uniform gap distribution. As a result, uneven discharge occurs during image formation, thereby impairing uniformity in image density.

Generally, there have already been proposed techniques for ensuring excellent development characteristics (e.g., uniformity in image density) by incorporating microparticles into the coating layer formed on the top surface of the charge roller, to thereby provide appropriate micro-roughness (see Patent Documents 1 to 3). However, in the case where the charge roller 10 fails to satisfy formulas (1) and (2), difficulty is encountered in controlling variation in inter-gap distance at the interface between the charge roller 10 and the photoreceptor, which variation would otherwise be suppressed by the below-mentioned surface roughness-imparting agent (particles) contained in the coating layer 14. A conceivable reason for this is as follows. The top-to-top inter-gap intervals on the surface of the roller substrate 13 vary, and the coating layer 14 is formed in the state where inter-particle distances are varied.

The roller substrate 13 having a surface roughness satisfying formula (1) preferably satisfies the following formula (3):

$$\text{circumferential } Rz1 \leq 15 \text{ μm} \tag{3}$$

wherein circumferential Rz1 represents the ten-point average roughness (Rz JIS 94) along the circumferential direction of the elastic layer 12.

When the circumferential Rz1 of the roller substrate 13 satisfying the condition formula (1) is adjusted to 15 μm or less, preferably 2 μm to 10 μm, and the coating layer 14 is formed so as to maintain the surface condition, circumferential Sm1 becomes smaller than circumferential Sm2 in the produced charge roller 10. In this case, the top height of the grooves in the surface decreases along the circumferential direction, and a shallow gap is provided. That is, the surface roughness along the circumferential direction decreases. When the charge roller 10 is caused to abut the photoreceptor, the gap size along the circumferential direction becomes uniform, and the charge roller 10 can maintain uniform gap distribution. As a result, excellent development performance can be ensured.

In contrast, when the charge roller 10 fails to satisfy the conditions (1) to (3), the top height of the grooves in the surface increases along the circumferential direction, and a deep gap is provided. In this case, the greater the circumferential Rz1, the greater the surface roughness along the circumferential direction. When the charge roller 10 falling outside the invention is caused to abut the photoreceptor, the gap size along the circumferential direction varies, whereby the charge roller 10 fails to maintain uniform gap distribution. As a result, uneven discharge occurs during image formation, thereby impairing uniformity in image density.

In other words, when the charge roller 10 does not satisfy any of formulas (1) to (3), difficulty is encountered in controlling variation in gap size along the circumferential direction at the interface between the charge roller 10 and the photoreceptor, which variation would otherwise be suppressed by the surface roughness-imparting agent. A conceivable reason for this is as follows. The gap size on the surface of the roller substrate 13 varies along the circumferential direction, and particles are trapped by the gap, to thereby provide flat regions in the surface. The coating layer 14 is formed under such conditions. Thus, in the aforementioned charge roller 10, since such a gap-less region is provided at the interface between the charge roller 10 and the photoreceptor, uniformity in image density fails to be ensured.

The roller substrate 13 having a surface roughness satisfying formulas (1) and (3) preferably satisfies the following formulas (4) and (5):

$$|\text{axial } Rz1 - \text{circumferential } Rz1| \geq 0.1 \ \mu\text{m} \quad (4)$$

$$\text{axial } Rz1 \leq 10 \ \mu\text{m} \quad (5),$$

wherein axial Rz1 represents the ten-point average roughness (Rz JIS 94) along the axial direction of the elastic layer 12.

When the difference between the axial Rz1 and the circumferential Rz1 of the roller substrate 13 satisfying the formulas (1) and (3) is 0.1 μm or greater, preferably 0.5 μm to 5 μm, or −0.1 μm or less, preferably −5 μm to −0.5 μm, and the axial Rz1 is adjusted to 10 μm or less, preferably 2 μm to 8 μm, and the coating layer 14 is formed so that the surface state is maintained, the charge roller 10 is produced so that the surface state is maintained. As a result, the circumferential Sm1 becomes smaller than the circumferential Sm2, and the surface roughness along the axial direction decreases. When the charge roller 10 as described is caused to abut the photoreceptor, the gap size along the axial direction becomes uniform, and can maintain uniform gap distribution. As a result, excellent image development characteristics can be ensured.

In contrast, when the charge roller 10 fails to satisfy formulas (1) to (5), the greater the axial Rz1, the greater the surface roughness of the surface along the axial direction. When the above charge roller 10 abuts the photoreceptor, the gap size varies along the axial direction, and the charge roller 10 fails to maintain uniform gap size. As a result, uneven discharge occurs during image formation, thereby impairing uniformity in image density.

In other words, when the charge roller 10 does not satisfy any of formulas (1) to (5), difficulty is encountered in controlling variation in gap size at the interface between the charge roller 10 and the photoreceptor along the axial direction, which variation would otherwise be suppressed by the surface roughness-imparting agent. A conceivable reason for this is as follows. The gap size on the surface of the roller substrate 13 varies along the axial direction, and particles are trapped by the gap, to thereby provide flat regions in the surface. The coating layer 14 is formed under such conditions. Thus, in the aforementioned charge roller 10, since such a gap-free region is provided at the interface between the charge roller 10 and the photoreceptor, uniformity in image density fails to be ensured.

As described above, in the present embodiment, after dry polishing, the surface of the roller substrate 13 may be further subjected to wet polishing by means of a wet-polishing machine employing waterproof polishing paper or the like, to thereby adjust the surface roughness. In a specific procedure of wet polishing, waterproof polishing paper (e.g., waterproof sandpaper) is caused to abut the roller substrate 13, while the roller is rotated under feeding of a polishing liquid. Notably, even after wet polishing has been performed, the surface roughness of the roller substrate 13 satisfies formulas (4) and (5).

As described above, in the present embodiment, the roller substrate 13 is dry-polished and optionally wet-polished, and the coating layer 14 is formed, to thereby produce the charge roller 10. Preferably, the coating treatment of the roller substrate 13 is performed, so that the aforementioned surface condition of the roller substrate 13 can be maintained to a maximum extent. The final surface roughness of the charge roller 10 satisfies the condition: circumferential Sm1<circumferential Sm2. No particular limitation is imposed on the method of forming the coating layer 14, while the surface condition of the roller substrate 13 is maintained so as to satisfy at least formula (1). Examples of the method include adjusting the amount, mean particle size, etc. of the surface roughness-imparting agent (particles) contained in the below-mentioned coating liquid, and adjusting the thickness of the coating layer 14. Although the details will be described later, in the present embodiment, the mean particle size of the particles contained in the coating liquid is adjusted to 20 μm in diameter, and the thickness of the coating layer 14 is adjusted to 5 μm. Under the conditions, the particle content is thus regulated, to thereby produce the charge roller 10 having a preferred surface roughness.

The coating layer 14 may be formed by applying a coating liquid on the roller substrate 13 (elastic layer 12) and drying and curing the applied coating liquid. Notably, examples of preferred coating techniques include dip coating, roller coating, and spray coating. In accordance with needs, a resistance-adjusting layer or the like may be inserted between the elastic layer 12 and the coating layer 14.

The coating liquid is prepared by dissolving at least a base material (30 parts by mass to 80 parts by mass), a conducting agent (1 part by mass to 50 parts by mass), and a surface roughness-imparting agent (4 parts by mass to 45 parts by mass) in a dilution solvent. The surface roughness-imparting agent is used for regulating the gap state between the charge roller 10 and the photoreceptor. Notably, when the coating liquid (coating layer 14) contains the base material, the conducting agent, and the surface roughness-imparting agent, the total amount of these components is 35 parts by mass to 175 parts by mass.

In the coating liquid, when the amount of the surface roughness-imparting agent (particles) is less than 4 parts by mass, the particle amount on the surface of the charge roller 10 is insufficient. Thus, when the charge roller 10 is in contact with the photoreceptor, gap portions provided from the particles at the interface between the surface of the charge roller 10 and the photoreceptor are present in some areas, but areas having no such portions are also present. Also, when no surface roughness-imparting agent (0 part by mass) is added to the coating liquid, the surface state of the charge roller cannot be maintained, even when the roller substrate 13 satisfying formula (1) is used. In other words, in such a case, Sm2 becomes excessively large, and gap portions provided by the particles present on the surface of the charge roller 10 with respect to the photoreceptor cannot be maintained. In contrast, when the amount of the surface roughness-imparting agent is in excess of 45 parts by mass, an excessive amount of the particles are present on the surface of the charge roller 10. In this case, particles are aggregated to form masses, and the masses are further aggregated (i.e., ternary aggregation). Due to the high-degree particle aggregation, the roughness of the surface of the charge roller 10 varies, whereby gap portions provided at the interface between the surface of the charge roller 10 and the photoreceptor are present in some areas, but areas having no such portions are also present. Therefore, when the amount of the surface roughness-imparting agent falls outside the aforementioned range, the surface state of the charge roller cannot be maintained, even when the roller substrate 13 satisfying formula (1) is used. As a result, the charge roller 10 fails to maintain uniform gap distribution, and uneven discharge occurs during image formation, thereby impairing uniformity in image density.

Notably, as described above, in the case where the coating liquid (coating layer 14) containing the base material, the conducting agent, and the surface roughness-imparting agent has a surface roughness-imparting agent content of about 4 parts by mass to about 45 parts by mass, particles are aggregated (secondary aggregation). However, the resultant aggregates are separated from one another by an appropriate distance. Thus, the gap state at the interface between the charge roller 10 and the photoreceptor can be regulated. In other words, when the coating layer 14 is formed at a particle content of about 4 parts by mass to about 45 parts by mass, the produced charge roller 10 has such a suitable surface roughness that the surface can maintain a surface condition of the roller substrate 13 at least satisfying formula (1).

Examples of the base material contained in the coating liquid include urethane resin, acrylic resin, acrylic urethane resin, amino resin, silicone resin, fluororesin, polyamide resin, epoxy resin, polyester resin, polyether resin, phenolic resin, urea resin, poly(vinyl butyral) resin, melamine resin, and nylon resin. These base materials may be used singly or in combination of two or more species. In the present embodiment, urethane resin is used.

Examples of the conducting agent contained in the coating liquid include carbon black products such as acetylene black, Ketjen black, and Tokablack; carbon nanotube; ionic species such as lithium perchlorate; ionic liquid such as 1-butyl-3-methylimidazolium hexafluorophosphate; metal oxides such as tin oxide; and electroconductive polymer. These conducting agents may be used singly or in combination of two or more species. In the present embodiment, carbon black, tin oxide, and a conductive polymer are used.

Examples of the surface roughness-imparting agent contained in the coating liquid include acrylic polymer particles, urethane polymer particles, polyamide resin particles, silicone resin particles, fluororesin particles, styrene resin particles, phenolic resin particles, polyester resin particles, olefin resin particles, epoxy resin particles, nylon resin particles, carbon, graphite, carbon balloon, silica, alumina, titanium oxide, zinc oxide, magnesium oxide, zirconium oxide, calcium sulfate, calcium carbonate, magnesium carbonate, calcium silicate, aluminum nitride, boron nitride, talc, kaolin, diatomaceous earth, glass beads, and hollow glass particles. These surface roughness-imparting agents may be used singly or in combination of two or more species.

In order to form the coating layer 14 while the surface state of the roller substrate 13 satisfies at least formula (1), the surface roughness-imparting agent used preferably has a mean particle size in diameter of 1 μm to 40 μm. When the mean particle size in diameter is less than 1 μm, particles are aggregated, to thereby cause variation in surface roughness of the coating layer 14, whereas when the mean particle size in diameter is in excess of 40 μm, the formed coating layer 14 is undesirably released from the roller substrate 13. In the present embodiment, acrylic polymer particles having a mean particle size in diameter of 20 μm are used.

No particular limitation is imposed on the dilution solvent contained in the coating liquid. Examples of the solvent include aqueous solvents and solvents such as methyl acetate, ethyl acetate, butyl acetate, methyl ethyl ketone (MEK), methyl isobutyl ketone (MIBK), methanol, ethanol, butanol, 2-propanol (IPA), acetone, toluene, xylene, hexane, heptane, and chloroform. In the present embodiment, water, ethyl acetate, butyl acetate, and MEK are used.

In production of the charge roller 10 by forming the coating layer 14, from the viewpoint of forming the coating layer 14 while the surface state of the roller substrate 13 satisfies at least formula (1), the thickness of the coating layer 14 is adjusted to 8 μm or less, preferably 2 μm to 6 μm. When the thickness is in excess of 8 μm, the surface characteristics of the subbing roller substrate 13 are not reflected on the formed coating layer 14, whereby the surface of the coating layer 14 becomes flat. In this case, suitable gap conditions cannot be provided between the charge roller 10 and the photoreceptor, thereby failing to ensure uniformity in image density. In the present embodiment, the formed coating layer 14 has a thickness of 5 μm.

The hardness of the charge roller 10 produced by forming the coating layer 14 on the roller substrate 13 is 45° to 65°. When the hardness of the charge roller 10 falls within the range, favorable images can be obtained through an image formation process. When the hardness of the charge roller 10 is lower than 45°, the protrusions of the surface of the charge roller 10 are readily worn, to thereby provide a dirty image (i.e., to result in image failure). When the hardness of the charge roller 10 is in excess of 65°, the pattern of protrusions on the surface of the charge roller 10 is imprinted onto the obtained images.

As described above, the charge roller 10 of the invention has the core 11, the elastic layer 12 which is mainly formed of a conductive rubber body and provided on the core 11, and the coating layer 14 provided on the elastic layer 12. The charge roller is produced such that a mean irregularity interval (Sm) along the circumferential direction of the elastic layer 12 is defined as circumferential Sm1, the coating layer 14 is formed on the roller substrate 13, and the surface condition of the roller substrate 13 satisfying the following formula (1) is maintained to a maximum extent. As a result, an image-forming apparatus employing the charge roller 10 suppresses generation of uneven images and ensures evenness in image density, whereby excellent development performance can be provided. In this embodiment, an index for assessing maintenance of the surface condition of the roller substrate 13 of the charge roller 10 is preferably employed. An example of the index is formula (2).

Also, in order to attain the aforementioned excellent development performance, the elastic layer 12 of the charge roller 10 of the embodiment has a ten-point average roughness (Rz JIS 94) along the circumferential direction (circumferential Rz1) and a ten-point average roughness (Rz JIS 94) along the axial direction (axial Rz1), which preferably satisfy the formulas (3) to (5). From the viewpoint of forming the coating layer 14 while the surface state of the roller substrate 13 is maintained, the following mode is preferred. Specifically, when the coating layer 14 of the charge roller 10 contains a base material, a conducting agent, and a surface roughness-imparting agent, and the total amount thereof is 35 parts by mass to 175 parts by mass, the amount of the surface roughness-imparting agent is adjusted to 4 parts by mass to 45 parts by mass.

EXAMPLES

The present invention will next be described in more detail by way of examples, which should not be construed as limiting the invention thereto.

Example 1

<Production of Roller Substrate>

In Example 1, sodium trifluoroacetate (conductivity-imparting agent) (0.5 parts by mass), zinc flower (3 parts by mass), stearic acid (2 parts by mass), and a vulcanizing agent (1.5 parts by mass) were added to epichlorohydrin rubber (Epichlomer CG-102; product of Daiso Co., Ltd.) (100 parts by mass), and the mixture was kneaded by means of a roller mixer. The kneaded product was press-formed onto the surface of a metallic core (diameter: 8 mm), to thereby yield a roller substrate having, on the surface of the metallic core, an elastic layer formed of a vulcanized epichlorohydrin rubber. In Example 1, the hardness of the elastic layer of the thus-produced roller substrate was measured by means of a type-A durometer ("JIS K 6253"). The measured hardness was about 45° to about 65°.

<Preparation of Coating Liquid>

Next, a coating liquid for forming a coating layer on the roller substrate was prepared. In a specific procedure, a base material, conducting agents 1 to 3, and a solvent for dilution shown in Table 1 were subjected to a dispersion treatment by means of a wet dispersion apparatus such as a bead mill, a sand mill, or a colloid mill, to thereby pulverize and homogenize the conducting agents 1 and 2. Subsequently, a surface roughness-imparting agent (mean particle size: 20 μm in diameter) was added to the mixture, and the resultant mixture was mixed by means of a mixer/agitator such as a propeller mixer, an agitation/homogenization mixer, or a ball mill, to thereby prepare a coating liquid.

<Measurement of Surface Roughness of Roller Substrate>

The surface roughness of the thus-polished roller substrate was measured by means of a surface roughness measurement apparatus (Surfcorder SE500, product of Kosaka Laboratory Ltd., JIS 94) under the following conditions. The obtained surface roughness parameters were ten-point average roughness along the axial direction (axial Rz1), ten-point average roughness along the circumferential direction (circumferential Rz1), and mean irregularity interval along the circumferential direction (circumferential Sm1). More specifically, axial Rz1 was measured at four points along the axial direction of the roller substrate. Circumferential Rz1 and circumferential Sm1 were measured in a similar manner. In each case, the four measurements were averaged to provide each surface roughness parameter. Table 2 shows the results.

[Measurement Conditions]

Cut-off: λc=2.5
Measurement length: λc×5
Measurement speed: 0.5 mm/sec

<Production of Charge Roller>

The above-prepared coating liquid was applied to the surface of the polished roller substrate, to thereby form a coating layer. In a specific procedure, the coating liquid was stirred through ultrasonication, and the thus-treated liquid was sprayed onto the surface of the roller substrate. The roller substrate was dried at 120° C. for 1 hour in an electric furnace, to thereby form a coating layer on the roller substrate. Thus, a charge roller was yielded.

<Measurement of Surface Roughness of Charge Roller>

Similar to the case of the roller substrates, the surface roughness of each of the produced charge rollers was measured. Table 2 shows the results. The determined surface roughness parameter was a mean irregularity interval along the circumferential direction (circumferential Sm2).

TABLE 1

| | Base material | | Conducting agent | | | | | | Surface roughness - imparting agent | | |
| --- | --- | --- | --- | --- | --- | --- | --- | --- | --- | --- | --- |
| | | | 1 | | 2 | | 3 | | | | |
| | Material | Amount [parts] | Material | Amount [parts] | Material | Amount [parts] | Material | Amount [parts] | Material | Amount [parts] | Dilution solvent |
| Ex. 1 | Urethane | 50 | Carbon | 15 | Sn oxide | 20 | Conductive | 15 | Acrylic | 4 | Water |
| Ex. 2 | resin | 50 | black | 15 | | 20 | polymer | 15 | resin | 25 | Water |
| Ex. 3 | | 50 | | 15 | | 20 | | 15 | particles | 45 | Water |
| Ex. 4 | | 50 | | 15 | | 20 | | 15 | | 45 | Et acetate |
| Ex. 5 | | 50 | | 15 | | 20 | | 15 | | 45 | Bu acetate |
| Ex. 6 | | 50 | | 15 | | 20 | | 15 | | 45 | MEK |
| Ex. 7 | | 50 | | 15 | | 20 | | 15 | | 4 | Water |
| Ex. 8 | | 50 | | 15 | | 20 | | 15 | | 25 | Water |
| Ex. 9 | | 50 | | 15 | | 20 | | 15 | | 45 | Water |
| Ex. 10 | | 50 | | 15 | | 20 | | 15 | | 25 | Et acetate |
| Ex. 11 | | 50 | | 15 | | 20 | | 15 | | 25 | Bu acetate |
| Ex. 12 | | 50 | | 15 | | 20 | | 15 | | 25 | MEK |
| Comp. 1 | | 50 | | 15 | | 20 | | 15 | | 4 | Water |
| Comp. 2 | | 50 | | 15 | | 20 | | 15 | | 25 | Water |
| Comp. 3 | | 50 | | 15 | | 20 | | 15 | | 45 | Water |
| Comp. 4 | | 50 | | 15 | | 20 | | 15 | | 2 | Water |
| Comp. 5 | | 50 | | 15 | | 20 | | 15 | | 50 | Water |

<Polishing of Roller Substrate Surface>

The above-produced roller substrate was polished by means of a polishing machine so as to attain predetermined dimensions. Then, the surface was further polished by means of the polishing machine, while the abrasive stone rotation rate was successively elevated from 1,000 rpm, to 2,000 rpm, to 3,000 rpm.

<Assessment of Surface Roughness>

Then, the surface roughness of the roller substrate was compared with that of the charge roller. Specifically, circumferential Sm1 of the roller substrate and circumferential Sm2 of the charge roller were compared with each other. Table 2 shows the results. Similarly, circumferential Rz1 of the roller substrate and axial Rz1 of the charge roller were compared with each other. Table 2 shows the results.

TABLE 2

| | Surface roughness of roller substrate [μm] | | | Surface roughness of charge roller [μm] | | Surface roughness of roller substrate and charge roller | |
|---|---|---|---|---|---|---|---|
| | Axial Rz1 | Circumferential Rz1 | Circumferential Sm1 | Circumferential Sm2 | Circumferential Sm conditions | Circumferential Rz - Axial Rz conditions | |
| Ex. 1 | 6.4 | 9.2 | 120 | 148 | Sm1 < Sm2 | Circumferential Rz1 > Axial Rz1 |
| Ex. 2 | 6.4 | 9.4 | 129 | 152 | Sm1 < Sm2 | Circumferential Rz1 > Axial Rz1 |
| Ex. 3 | 6.8 | 10.0 | 132 | 143 | Sm1 < Sm2 | Circumferential Rz1 > Axial Rz1 |
| Ex. 4 | 6.7 | 8.6 | 130 | 132 | Sm1 < Sm2 | Circumferential Rz1 > Axial Rz1 |
| Ex. 5 | 4.4 | 8.3 | 131 | 135 | Sm1 < Sm2 | Circumferential Rz1 > Axial Rz1 |
| Ex. 6 | 7.6 | 11.3 | 131 | 138 | Sm1 < Sm2 | Circumferential Rz1 > Axial Rz1 |
| Ex. 7 | 2.1 | 1.8 | 78 | 150 | Sm1 < Sm2 | Circumferential Rz1 < Axial Rz1 |
| Ex. 8 | 3.8 | 3.1 | 99 | 148 | Sm1 < Sm2 | Circumferential Rz1 < Axial Rz1 |
| Ex. 9 | 7.6 | 5.7 | 126 | 143 | Sm1 < Sm2 | Circumferential Rz1 < Axial Rz1 |
| Ex. 10 | 2.4 | 2.1 | 98 | 146 | Sm1 < Sm2 | Circumferential Rz1 < Axial Rz1 |
| Ex. 11 | 2.6 | 2.3 | 77 | 149 | Sm1 < Sm2 | Circumferential Rz1 < Axial Rz1 |
| Ex. 12 | 2.3 | 2.1 | 70 | 152 | Sm1 < Sm2 | Circumferential Rz1 < Axial Rz1 |
| Comp. 1 | 5.9 | 8.2 | 169 | 156 | Sm1 > Sm2 | Circumferential Rz1 > Axial Rz1 |
| Comp. 2 | 6.9 | 8.7 | 151 | 142 | Sm1 > Sm2 | Circumferential Rz1 > Axial Rz1 |
| Comp. 3 | 6.5 | 9.0 | 142 | 139 | Sm1 > Sm2 | Circumferential Rz1 > Axial Rz1 |
| Comp. 4 | 6.3 | 7.0 | 125 | 135 | Sm1 < Sm2 | Circumferential Rz1 > Axial Rz1 |
| Comp. 5 | 7.5 | 8.9 | 130 | 145 | Sm1 < Sm2 | Circumferential Rz1 > Axial Rz1 |

<Assessment of Image Uniformity (Unevenness in Image Density)>

An image assessment test was performed with respect to each charge roller, which was set in an actual printer. Specifically, each of the produced charge rollers was set in a printer (A3-size color MFP 25 sheets/min), and a color image was obtained through printing under the following conditions. Image uniformity (unevenness in image density) of the obtained image was evaluated by means of a chroma meter CR-400 (product of Konika Minolta Japan, Inc.). Table 3 shows the results. Unevenness in image density was assessed by measuring $L^*$ at 6 points (4 corners and 2 centers) of the printed image sheet and calculating the variance σ among them. The ratings of the assessment are as follows.

[Printing Conditions]
Applied voltage: DC=−1,000 V
Speed: 154 mm/sec
Printing conditions: 10° C.×20%

[Ratings of Assessment]
○: no unevenness in image density (σ≤0.06 among 6 $L^*$ values)
Δ: unevenness in image density (0.06<σ≤0.32 among 6 $L^*$ values)
X: unevenness in image density (0.32<σ among 6 $L^*$ values)

TABLE 3

| | Image uniformity (unevenness in image density) | |
|---|---|---|
| | $L^*$ variation σ min-max | Ratings |
| Ex. 1 | 0.02-0.05 | ○ |
| Ex. 2 | 0.02-0.06 | ○ |
| Ex. 3 | 0.02-0.04 | ○ |
| Ex. 4 | 0.03 | ○ |
| Ex. 5 | 0.03 | ○ |
| Ex. 6 | 0.04 | ○ |
| Ex. 7 | 0.02-0.04 | ○ |
| Ex. 8 | 0.02-0.06 | ○ |
| Ex. 9 | 0.03-0.04 | ○ |
| Ex. 10 | 0.05 | ○ |
| Ex. 11 | 0.06 | ○ |
| Ex. 12 | 0.03 | ○ |
| Comp. 1 | 0.37-0.49 | X |
| Comp. 2 | 0.33-0.68 | X |
| Comp. 3 | 0.11-0.34 | Δ to X |
| Comp. 4 | 0.08 | Δ |
| Comp. 5 | 0.30 | Δ |

Examples 2 and 3

In Examples 2 and 3, the procedure of Example 1 was repeated, except that the amount of the surface roughness-imparting agent in the coating liquid was changed, whereby charge rollers were produced (see Table 1), surface roughness was measured with respect to roller substrates and charge rollers (see Table 2), and image uniformity (unevenness in image density) was assessed with respect to each charge roller, which was set in an actual printer (see Table 3).

Examples 4 to 6

In Examples 4 to 6, the procedure of Example 3 was repeated, except that the dilution solvent for the coating liquid was changed, whereby charge rollers were produced (see Table 1), surface roughness was measured with respect to roller substrates and charge rollers (see Table 2), and image uniformity (unevenness in image density) was assessed with respect to each charge roller, which was set in an actual printer (see Table 3).

Example 7

In Example 7, the procedure of Example 1 was repeated, except that the relationship between the circumferential Rz1 and the axial Rz1 of the roller substrate was changed, whereby charge rollers were produced (see Table 1), surface roughness was measured with respect to roller substrates and charge rollers (see Table 2), and image uniformity (unevenness in image density) was assessed with respect to each charge roller, which was set in an actual printer (see Table 3). In Example 7, the surface of the roller substrate was polished and further polished by means of a wet-polishing machine employing water-resistant abrasive paper, to thereby modify the relationship between circumferential Rz1 and axial Rz1 of the roller substrate.

Examples 8 and 9

In Examples 8 and 9, the procedure of Example 7 was repeated, except that the amount of the surface roughness-imparting agent in the coating liquid was changed, whereby charge rollers were produced (see Table 1), surface roughness was measured with respect to roller substrates and charge rollers (see Table 2), and image uniformity (unevenness in image density) was assessed with respect to each charge roller, which was set in an actual printer (see Table 3).

Examples 10 to 12

In Examples 10 to 12, the procedure of Example 8 was repeated, except that the dilution solvent for the coating liquid was changed, whereby charge rollers were produced (see Table 1), surface roughness was measured with respect to roller substrates and charge rollers (see Table 2), and image uniformity (unevenness in image density) was assessed with respect to each charge roller, which was set in an actual printer (see Table 3).

Comparative Example 1

In Comparative Example 1, the procedure of Example 1 was repeated, except that the relationship between the circumferential Sm1 of the roller substrate and the circumferential Sm2 of the charge roller was changed, whereby a charge roller was produced (see Table 1), surface roughness was measured with respect to the roller substrate and the charge rollers (see Table 2), and image uniformity (unevenness in image density) was assessed with respect to the charge roller, which was set in an actual printer (see Table 3). In Comparative Example 1, the abrasive stone rotation rate during polishing the surface of the roller substrate was successively reduced from 3,000 rpm, to 2,000 rpm, to 1,000 rpm, whereby a coating layer is formed such that the circumferential Sm1 of the roller substrate was adjusted to be in excess of 135 μm.

Comparative Examples 2 and 3

In Comparative Examples 2 and 3, the procedure of Comparative Example 1 was repeated, except that the amount of the surface roughness-imparting agent in the coating liquid was changed, whereby charge rollers were produced (see Table 1), surface roughness was measured with respect to roller substrates and charge rollers (see Table 2), and image uniformity (unevenness in image density) was assessed with respect to each charge roller, which was set in an actual printer (see Table 3).

Comparative Examples 4 and 5

In Comparative Examples 4 and 5, the procedure of Example 1 was repeated, except that the amount of the surface roughness-imparting agent in the coating liquid was changed, whereby charge rollers were produced (see Table 1), surface roughness was measured with respect to roller substrates and charge rollers (see Table 2), and image uniformity (unevenness in image density) was assessed with respect to each charge roller, which was set in an actual printer (see Table 3).

Results

In Examples 1 to 3, the charge rollers were polished, while the rotation rate of the abrasive stone of the polishing machine was elevated successively from 1,000 rpm, 2,000 rpm, 3,000 rpm. As a result, the roller substrates were found to have a circumferential Sm1 of 135 μm or less, a circumferential Rz1 of 15 μm or less, and an axial Rz1 of 10 μm or less. The difference between circumferential Rz1 and axial Rz1 was 0.1 μm or more. When a coating layer was formed on such a roller substrate by use of a coating liquid having a surface roughness-imparting agent of 4 parts by mass to 45 parts by mass, the produced charge roller was found to have such a surface roughness that circumferential Sm1 was smaller than circumferential Sm2. As a result, in image evaluation, the thus-produced charge rollers provided uniform images having no unevenness in image density.

When a dilution solvent other than water was used (Examples 4 to 6); when circumferential Rz1 was smaller than axial Rz1, and the difference therebetween was −0.1 μm or less (Examples 7 to 9); or when a dilution solvent other than water was used, circumferential Rz1 was smaller than axial Rz1, and the difference therebetween was −0.1 μm or less (Examples 10 to 12), the same image evaluation test results as those of Examples 1 to 3 were obtained. Thus, no unevenness in image density was observed under these conditions.

In contrast, in Comparative Examples 1 to 3, even when the roller substrates have an axial Rz1 of 10 μm or less and a circumferential Rz1 of 15 μm or less, the circumferential Sm1 was in excess of 135 μm. Since roller substrates having such an unfavorable surface roughness were employed, the formed coating layers maintained the unfavorable surface conditions, and circumferential Sm1 was greater than circumferential Sm2. As a result, these charge rollers provided unevenness in image density in the image evaluation test. In Comparative Example 4, the amount of the surface roughness-imparting agent on the coating liquid was less than 4 parts by mass, and in Comparative Example 5, the amount was in excess of 45 parts by mass. Thus, even when a roller substrate satisfying formula (1) was employed, the surface roughness was not maintained. As a result, the produced charge rollers provided unevenness in image density in the image evaluation test.

INDUSTRIAL APPLICABILITY

The conductive roller of the present invention is suitably employed as, in particular, a charge roller of an electrophotographic image-forming apparatus (e.g., a copying machine or a printer). The conductive roller of the present invention is also suited as a development roller, a charge roller, a transfer roller, a toner-supplying roller, or the like.

DESCRIPTION OF REFERENCE NUMERALS

10 charge roller
11 core
12 elastic layer
13 roller substrate
14 coating layer

The invention claimed is:

1. A conductive roller having a core, at least one elastic layer which is mainly formed of a conductive rubber body and provided on the core, and a coating layer provided on the elastic layer, wherein a mean irregularity interval (Sm) along the circumferential direction of the elastic layer is defined as circumferential Sm1, and a mean irregularity interval (Sm) along the circumferential direction of the coating layer is defined as circumferential Sm2, wherein circumferential Sm1 and circumferential Sm2 satisfy the following formulas (1) and (2):

$$\text{circumferential } Sm1 \leq 135 \text{ μm} \quad (1)$$

$$\text{circumferential } Sm1 < \text{circumferential } Sm2 \quad (2).$$

2. A conductive roller according to claim 1, wherein a ten-point average roughness (Rz JIS 94) along the circumferential direction of the elastic layer is defined as circumferential Rz1, which satisfies the following formula (3):

$$\text{circumferential } Rz1 \leq 15 \text{ μm} \quad (3).$$

3. A conductive roller according to claim 1, wherein a ten-point average roughness (Rz JIS 94) along the axial direction of the elastic layer is defined as axial Rz1, which satisfies the following formulas (4) and (5):

$$|\text{axial } Rz1 - \text{circumferential } Rz1| \geq 0.1 \text{ μm} \quad (4)$$

$$\text{axial } Rz1 \leq 10 \text{ μm} \quad (5).$$

4. A conductive roller according to claim 1, wherein the coating layer contains a base material, an electric conductivity-imparting agent, and a surface roughness-imparting agent, and when the total amount of these components is 35 parts by mass to 175 parts by mass, the amount of the surface roughness-imparting agent is 4 parts by mass to 45 parts by mass.

* * * * *